Patented Mar. 22, 1932

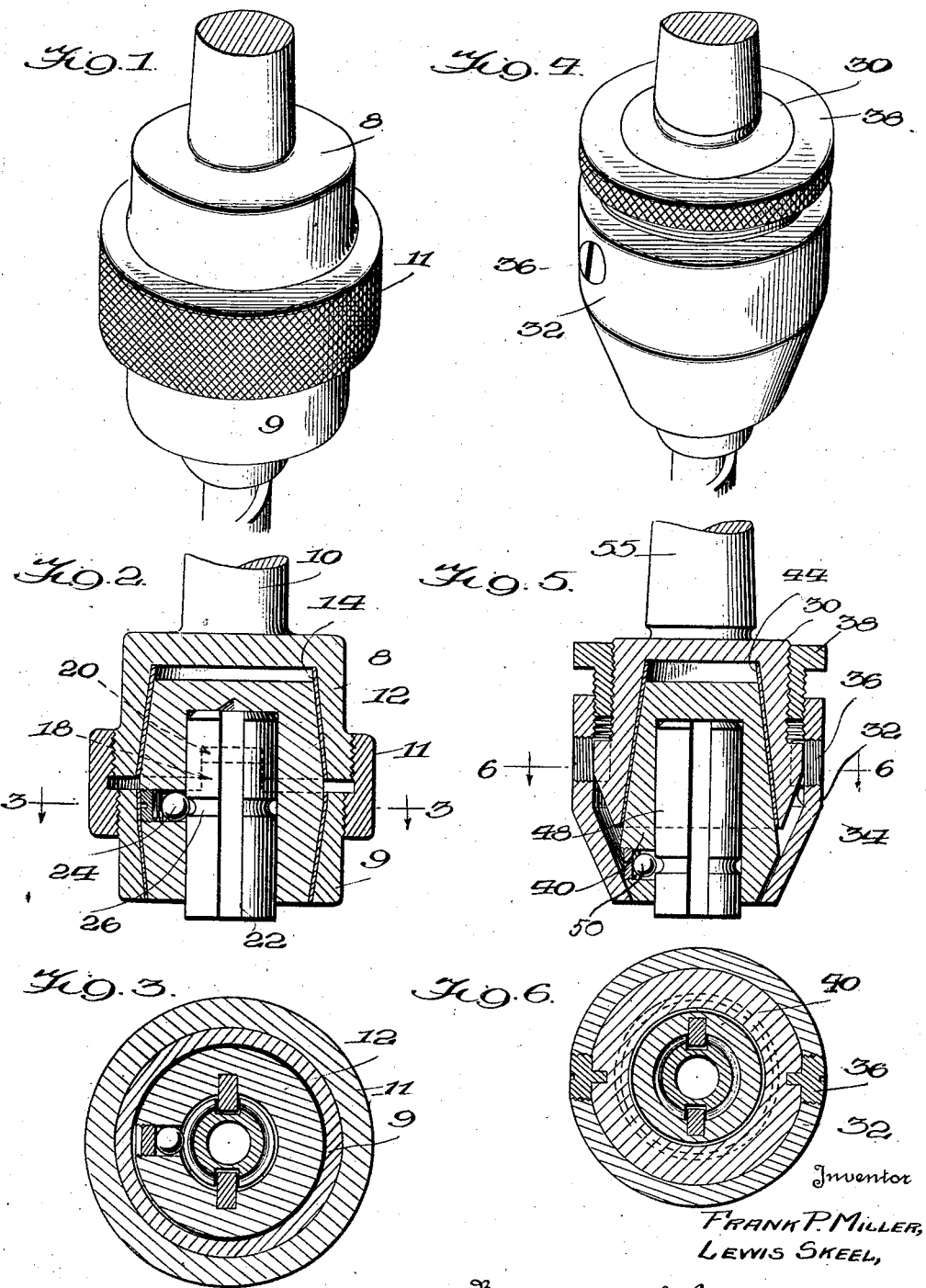

1,850,938

UNITED STATES PATENT OFFICE

FRANK P. MILLER AND LEWIS SKEEL, OF MEADVILLE, PENNSYLVANIA, ASSIGNORS TO McCROSKY TOOL CORPORATION, OF MEADVILLE, PENNSYLVANIA, A CORPORATION OF PENNSYLVANIA

TAPPING OR TOOL HOLDER

Application filed August 12, 1926. Serial No. 128,826.

This invention relates to tapping and tool holders and represents an improvement over the construction shown in United States Patent No. 991,630, to Frank P. Miller granted May 9, 1911.

The holder forming the subject matter of this application marks an advance over the holder shown in the above mentioned patent in that the location and arrangement of the main adjusting member permits of the employment of an attaching shank of conventional or other design.

Another feature of the invention resides in the arrangement and construction by which the main adjusting member is highly accessible and by which the manufacture is simplified and cheapened, all without detracting in the slightest degree from the utility and durability of the device.

Other objects and advantages will be apparent during the course of the following description.

In the accompanying drawings forming a part of this application and in which like numerals are employed to designate like parts throughout the same, Figure 1 is a fragmentary perspective of the device;

Figure 2 is a vertical sectional view through the same;

Figure 3 is a horizontal sectional view taken on line 3—3 of Figure 2;

Figure 4 is a fragmentary perspective of a slightly modified form of the invention;

Figure 5 is a vertical sectional view through the form of invention illustrated in Figure 4;

Figure 6 is a horizontal sectional view taken on line 6—6 of Figure 5.

In the drawings, the numerals 8 and 9 designate the upper and lower sections, respectively, of a driving body, the section 8 being provided with a shank 10 by which the device may be attached to a machine spindle of conventional or other design. The shank 10 may have a Morse taper or it may be otherwise formed.

As illustrated, the sections 8 and 9 are longitudinally aligned and are joined by a main adjusting nut 11, which not only functions as a connector for the sections, but also as a means to vary the friction between the driving body and a driven body 12.

It is noted that the threads which connect the adjusting nut 11 to the lower section 9 are of a much finer pitch than the threads which connect the adjusting member to the upper section 8, and thus the turning of the nut 11 brings about a very fine but powerful adjustment or variation in the friction between the driving and driven bodies. The threads on the sections 8 and 9 are to be extended in the same direction.

In more specifically describing this feature of the invention, it is pointed out that the adjacent portions of the sections 8 and 9 are externally threaded for engagement by the separate threads of the differential nut 11, whereby the sections 8 and 9 may be drawn closer together or more widely separated depending on the degree of friction desired.

Figure 2 clearly illustrates that the driven body 12 is tapered toward the ends thereof as are the bores of the sections 8 and 9, so that when the sections 8 and 9 are drawn in the direction of each other the tapered end portions of the driven body 12 are more firmly gripped to bring about a more positive driving connection. A friction lining 14 of fiber or other suitable material is located between the driving and driven bodies.

To provide for the proper operation of the adjusting feature of the invention it is necessary to hold the section 9 against turning with respect to the section 8 and to accomplish this, the section 9 may be provided with a key 18 having a constant sliding fit in a socket or recess 20 in the upper section 8. This arrangement may be reversed and as many of the keys 18 may be employed as are necessary. It will be seen that the interlocking sliding connection 18—20 between the sections 8 and 9 is enclosed by the combined connecting and differential nut 11.

A bushing 22 may be fitted within the socket in the driven body 12 and is engaged by a spring-pressed ball 24, which ball is partly received in a circumferential groove 26 in the intermediate portion of the bushing. Obviously, the bushing 22 is adapted for connection with a tap or other tool, but if desired the tap or the tool may be introduced directly into the socket of the driven body without the intervention of the bushing.

In the form of invention illustrated in Figures 4, 5 and 6, the two main sections of the driving body are designated by the numerals 30 and 32, the section 30 being extended partly into the section 32 and having a longitudinally movable fit therein, so that the sections may be adjusted with respect to each other. The lower portion of the section 30 is externally enlarged and is provided with longitudinal grooves for the reception of keys 34. The keys 34 have threaded attaching heads 36 which are secured in openings in the cylindrical rear or upper portion of the section 32. The provision of the keys 34 makes it possible for the sections 30 and 32 to be adjusted longitudinally with respect to each other through the medium of a differential nut 38, but prevents the turning of one section with respect to the other at all times and especially during the adjustment of the device.

Figure 5 illustrates that the section 30 fits within the section 32 and that the threads connecting the nut 38 and the section 30 are of a much coarser pitch than the threads between the nut 38 and the outer section 36, whereby turning of the nut 30 will result in a fine, but positive adjustment of the sections with respect to each other.

Figure 5 also illustrates that a driven body 40 is positioned within the sections 30 and 32 and is tapered toward the ends thereof from a point adjacent its lower extremity. The oppositely tapered body 40 is driven by the sections 30 and 32 and a lining of fiber 44 or other suitable friction material may be employed between the driving and driven bodies, as illustrated.

A bushing 48 may be secured in the socket of the driven body 40 through the medium of a spring-pressed ball 50 or the tap or other tool may be introduced directly into the socket without the employment of the bushing.

In this form of invention, the upper portion of the section 30 is provided with a shank 55 of any suitable design.

With reference to the foregoing description taken in connection with the accompanying drawings, it will be seen that the location and arrangement of the main adjusting member in each form of the invention makes it possible to employ the shank at the top of the device, which shank permits of the attachment of the device to the spindle of a drill-press, a tapping machine, or the like.

The foregoing also illustrates that the invention forming the subject of this application is capable of a wide variety of mechanical expressions and it is, therefore, to be understood that the forms of the invention herewith shown and described are to be taken merely as preferred examples of the same and that such minor changes in arrangement and construction of parts may be made as will remain within the spirit of the invention and the scope of what is claimed.

Having thus described the invention what is claimed, is:

1. A tool holder comprising a pair of aligned sections having openings enlarged toward the opposed ends thereof, separate friction linings in said openings and removable through the enlarged ends thereof, a body tapered toward both ends thereof and received in said openings, and a combined connecting and adjusting differential nut detachably joining said sections.

2. A tool holder comprising a pair of aligned sections having openings enlarged toward the opposed ends thereof, separate friction linings in said openings and removable through the enlarged ends thereof, a body tapered toward both ends thereof and received in said openings, and a combined connecting and adjusting differential nut detachably connecting said sections, there being an interlocking slidable connection holding one section against turning with respect to the other section and being encircled by said differential nut.

3. A tool holder comprising a pair of sections arranged end to end and having aligned openings enlarged toward the opposed ends thereof, friction linings in said openings, a body tapered toward the ends thereof and received in said openings, and a combined connecting and differential nut having threaded engagement with the opposed portions of said sections.

4. In a tool holder, a pair of approximately aligned sections normally out of engagement with each other and having inner opposed end portions formed with differential threads, said sections being provided with oppositely directed cone-shaped sockets, a tool suporting body having cone-shaped portions received in said sockets, and a combined connecting and differential nut having connection with the differential threads on the opposed inner end portions of said sections for drawing said sections into engagement with said tool supporting body.

5. In a tool holder, a pair of approximately aligned sections having inner end portions formed with differential threads and having the inner ends thereof normally out of engagement with each other, said sections being provided with sockets, a body in said sockets, one of said sockets and the adjacent portion of said body being of corresponding conical form, and a combined connecting and differential nut having connection with the differential threads on the opposed inner end portions of said sections, for drawing said sections into engagement with said body, there being an interlocking slidable connection holding one section against turning with respect to the other and being enclosed by said differential nut.

6. In a tool holder, a tool supporting body, a pair of sections having sockets receiving said body, one of said sockets and the adjacent portion of said body being correspondingly diminished in diameter toward one end of the body, said pairs of sections being arranged end-to-end with the inner ends thereof normally out of engagement with each other, and a combined connecting and differential nut threaded on the opposed inner end portions of said sections to join the sections and thereby draw the sections into operative relation to said tool supporting body, the opposed inner portions of said sections being provided with an interlocking slidable connection holding one section against turning with respect to the other.

In testimony whereof we affix our signatures.

FRANK P. MILLER.
LEWIS SKEEL.